United States Patent [19]

Brehme

[11] Patent Number: 4,894,109

[45] Date of Patent: Jan. 16, 1990

[54] METHOD AND APPARATUS FOR TACKING TOGETHER THE COPIES OF MULTICOPY FORMS

[76] Inventor: Bodo Brehme, Gumbertstrasse 133, D-4000 Duesseldorf, Fed. Rep. of Germany

[21] Appl. No.: 227,690

[22] Filed: May 25, 1988

[51] Int. Cl.[4] .......... B32B 31/18

[52] U.S. Cl. .......... 156/256; 156/517; 156/518; 156/520; 156/521; 156/530

[58] Field of Search .......... 156/256, 252, 253, 517, 156/518, 519, 520, 530, 514, 521

[56] References Cited

U.S. PATENT DOCUMENTS

| | | | |
|---|---|---|---|
| 731,702 | 6/1903 | Monforts | 156/530 |
| 2,507,683 | 5/1950 | Smith | 156/519 |
| 4,409,062 | 11/1983 | Conti | 156/518 |

FOREIGN PATENT DOCUMENTS

| | | | |
|---|---|---|---|
| 0054009 | 8/1986 | European Pat. Off. . | |
| 1436814 | 1/1969 | Fed. Rep. of Germany | 156/519 |

*Primary Examiner*—Caleb Weston

*Attorney, Agent, or Firm*—Shlesinger & Myers

[57] ABSTRACT

A method and apparatus for tacking together multipage forms having pin holes with the use of adhesive tacking tape.

16 Claims, 1 Drawing Sheet

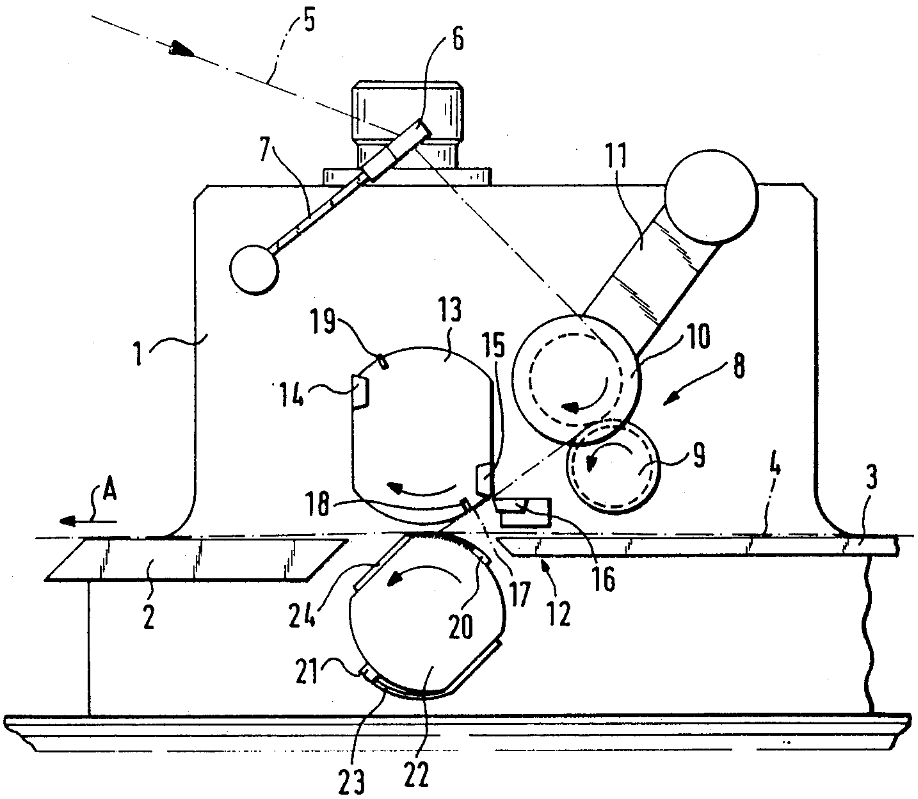
5
6
7
11
1
19
13
15
10
8
14
9
4
3
A
18
16
2
24
17
12
20
21
23
22

METHOD AND APPARATUS FOR TACKING TOGETHER THE COPIES OF MULTICOPY FORMS

The invention concerns a method for tacking together the copies of multi-copy forms as defined in the preamble of claim 1 and also an apparatus for carrying out the method defined in the preamble of claim 4.

As a rule, multicopy forms consist of several layers of accordion-folded lengths of form which either are themselves of copying nature or contain inserted between them sheets of carbon paper. As a rule, pin feed-holes are present on both sides for advancing the forms, and can be engaged by a printer tractor. The pin feed-holes, as a rule, are joined to the form lengths by perforated lines, and therefore can be removed following printing.

The individual copies of a multi-copy form must be kept together, and be fixed in place relative to one another to assure that the superposed copies do not mutually shift during printing or writing, i.e., to make sure that they keep their intended coinciding positions. To achieve this fixation, resort is made, among other means, to small adhesive strips passing through the individual holes of the pin feed-holes, which strips thereby grip the sheets of a multicopy form in the manner of a bail.

The adhesive strips are mounted in the stated manner by special devices. Such a device is described in the European patent document B1 0 054 009. It comprises a feed for a multicopy form and another feed for the adhesive strip parallel to the direction of advance. The latter feed takes the adhesive strip off a roll and moves it to the particular pin feed-hole of a compression means. This compression means consists of two superposed rollers subtending a gap between themselves through which the multicopy form passes and into which the adhesive strip is inserted.

The two rollers comprise compression segments fixing the adhesive strip entering the gap onto the pin feed-holes. Directly behind the compression means rounding, a punch is mounted to the upper compression segment and matches a groove in the lower compression segment. The punch and the groove form a severing means, and act as a knife and counter-blade. As the rollers revolve, the knife and counterblade therefore cut the adhesive strip from that entering the gap. When an adhesive strip has been severed, its supply is then initially interrupted. If another adhesive strip must be deposited, then it will be moved again in the direction of the multicopy form and hence into the gap between the two rollers.

This device incurs substantial drawbacks due to the fact that the adhesive strip is severed from the mother tape only following complete deposition, which entails that the cutting must pass through the paper of the multicopy form which thereby is heavily damaged. Moreover heavy stresses are experienced by the knife and counter-blade, resulting in premature wear. Because the multicopy forms assume different thicknesses, the stresses also vary depending upon thickness, and excessive stresses are also encountered. If the multicopy form does tear, the adhesive strips are pressed against the compression segments, after which the device requires laborious cleaning.

Another drawback is incurred when the multicopy form consists of self-copying papers. In that case, the knife and the counter-blade are subjected to chemical corrosion, from the liquid in the micro-capsules, as the knife cuts through the multi-copy form. Thereupon, the knife and counter-blade are subjected to both mechanical and chemical stresses and wear rapidly.

Accordingly, it is the object of the invention to so modify the previously known procedure that the multicopy form no longer shall be damaged when the adhesive strip is severed, so that the wear of the severing means shall be reduced. Another object of the invention is an apparatus to carry out this method and one which is of simple design.

As regards the method, the invention solves the above problem by cutting the adhesive strip before it is fully deposited on the multicopy form. The cutting of the adhesive strip can take place after its front section—as seen in the direction of feed—has been placed on the multi-copy form, whereby the advantage is obtained that the adhesive strip shall already be fixed in part on the multicopy form while it is being cut from the adhesive tape above the multicopy form. This is especially advantageous when the adhesive strip is long. As regards shorter adhesive strips, they may be severed shortly before being deposited on the multicopy form, because, in view of the rapidity of motion of the multicopy form and adhesive tape and its own inertia, it will also deposit in this eventuality at the predetermined location where it can then be compressed.

The severing of the adhesive strip before it is totally deposited, and therefore above the multicopy form, offers the advantage that it is no longer necessary to cut through the multicopy form. Therefore, the knife and the counter-blade now are stressed only by the slight and always constant thickness of the adhesive strip. Damage to the multicopy form is avoided. Hence, the knife and the counter-blade are also free from chemical corrosion by the micro-capsules in self-copying multicopies.

The apparatus to carry out the method is characterized by the invention in that the severing means is mounted away from the compression means, and, together with the knife and the counter-blade, above the multicopy form conveyor. Besides the advantages already cited, this arrangement provides the advantage that the adhesive strip may be supplied continuously and, accordingly, a complex, discontinuous feed, such as described in the European patent document B1 0 054 009, is not required.

Appropriately, the knife is mounted to a revolving roller and matches a stationary knife. At the same time, the roller can be part of the compression means, and may comprise a compressing cam ahead of the knife as seen in the direction of rotation.

The drawing shows the invention by means of a schematic illustrative embodiment in more comprehensive manner. The FIGURE is a side view of the first part of an apparatus for tacking the copies of a multicopy form.

The apparatus comprises a housing component 1 to which are fastened horizontal support surfaces 2, 3. These support surfaces 2, 3 form the path of a multicopy form 4, represented here by a dot-dash line. The drive for the multicopy form 4 is conventional and therefore omitted. The multicopy form 4 moves in the direction of the arrow A.

An adhesive tape 5—also shown by dot-dash lines—is supplied from above. It passes through a guide eyelet 6 in a pivot lever 7. Next, the adhesive tape 5 passes through a feed 8 consisting of a motor-driven roller 9 and a compression roller 10. The compression roller 10 is prestressed against the driver roller 9 and rests on a pivot lever 11.

While moving obliquely toward the multcopy form 4, the adhesive tape 5 arrives in the region of a cutter 12. This cutter 12 consists, on the one hand, of two knives 14, 15 mounted on a roller 13 and on the other hand, of a stationary counter-blade 16 mounted immediately above the path of the multicopy form 4. The roller 13 is motor-driven. When one of the two knives 14, 15 impinges on the counter-blade 16, the adhesive tape 5 passing therebetween will be cut. The angular speeds of the feed 8 and the cutter 12 are so matched that always the desired length of adhesive tape 6 will be cut. Regarding the speed of the multicopy form 4, the synchronization is such that severing the adhesive strips 17 from the adhesive tape 5 cause them to arrive at regular intervals on the multicopy form 4.

As viewed in the direction of rotation, the roller 13 comprises a compression cams 18, 19 ahead of the knives 14, 15 and projecting therefrom somewhat, while also being rigidly set in place. These compression cams 18, 19 cooperate with spring-supported compression cams 20, 21 on a second roller 22 mounted precisely below the roller 13. The compression cams 20, 21 are coupled to two flat springs 23, 24 extending circumferentially.

Both rollers 13, 22 are mutually synchronized so that their compression cams 18, 19 and 20, 21 clamp pairwise the multicopy form 4 together with the adhesive strip 17 deposited on it, whereby the adhesive strip 17 is tacked to the multicopy form 4 once the adhesive strip 17 has been cut. Thereupon the multicopy form 4 moves on and in a further work-station not described herein in further detail, parts of the adhesive strip 17 are forced through the pin feed holes of the multicopy form 4 and bent around onto its back side. This is carried out in known and conventional manner.

The above described procedure continuously repeats itself, that is, the adhesive tape 5 is pulled by the feed 8, whereupon the cutter 12 severs an adhesive strip 17 which then is tacked by two mutually opposite compression cams 18, 19 and 20, 21 respectively.

I claim:

1. The method of tacking together multipage forms having pin feed holes, comprising the steps of:
(a) providing a multipage form;
(b) providing a supply of adhesive tacking tape;
(c) longitudinally advancing the form;
(d) advancing a length of the tape parallel to the direction in which the form advances;
(e) severing the tape with rotary cutter means so that the severed length is deposited on the form overlying one of the pin feed holes;
(f) advancing the form through compression means and thereby causing the deposited tape to be tacked on the form;
(g) pushing a portion of the severed tape through the associated pin feed hole; and,
(h) folding back the tape portion extending through the pin feed hole for causing the portion to engage the opposite side of the form.

2. The method of claim 1, including the step of:
(a) severing the tape after the leading edge thereof has been deposited onto the form.

3. The method of claim 1, including the step of:
(a) severing the tape prior to the leading edge thereof having been deposited onto the form.

4. The method of claim 1, including the step of:
(a) tacking the tape to the form by passing the form between first and second cooperating rotating roller means.

5. The method of claim 4, including the step of:
(a) advancing the tape parallel to the form by passing the tape through third and fourth cooperating roller means.

6. The method of claim 5, including the step of:
(a) regulating the rotational speed of the first and second roller means in response to the rotational speed of the third and fourth roller means.

7. Machine for tacking together multipage forms having pin feed holes, comprising:
(a) feed means for advancing a strip of tacking tape comprising first and second cooperating mutually rotating rollers between which the tape is advanced;
(b) a stationary blade downstream of said first and second rollers and over which the tape passes;
(c) cutter means cooperating with said stationary blade for selectively severing a length of the tape, the operational speed of said cutter means being matched with the rotational speed of said feed means for providing uniformity in the severing of the tape;
(d) compression means disposed proximate said cutter means for advancing a form having pin feed holes and for causing a length of severed tape deposited over a pin feed hole of the form to be tacked thereto; and,
(e) press-through and fold-back means disposed downstream of said compression means and cooperating with the form for pressing a portion of the severed tape through the associated pin feed hole and for folding back the pressed-through portion.

8. The machine of claim 7, wherein:
(a) said cutter means including a third roller means having a cutting blade extending from the periphery thereof and cooperating with said stationary blade, and the rotational speed of said third roller means being matched with the rotational speed of said feed means; and,
(b) said compression means including a fourth roller means disposed proximate said third roller means and cooperating therewith.

9. The machine of claim 8, wherein:
(a) a first compression cam extending from said third roller means; and,
(b) a second compression cam extending from said fourth roller means and cooperating with said first cam for clamping the form therebetween.

10. The machine of claim 9, wherein:
(a) biasing means cooperating with said second cam.

11. The machine of claim 8, wherein:
(a) said third roller means having first and second oppositely disposed substantially planar side portions interconnected by arcuate portions; and,
(b) said cutting blade extending from one of said side portions.

12. The machine of claim 11, wherein:
(a) there are two cutting blades, each of said cutting blades extending from one of said side portions and said cutting blades extending in opposite directions.

13. The machine of claim 12, wherein:
(a) each of said cutting blades being disposed at and extending from a terminus of the associated side portion.

14. The machine of claim 12, wherein:

(a) each of said cutting blades having a planar side portion, and said cutting blades planar side portions extending generally parallel to the associated roller means planar side portions.

15. The machine of claim 8, wherein:

(a) said stationary blade being disposed above said fourth roller means.

16. The machine of claim 15, wherein:

(a) said stationary blade being disposed intermediate said third roller means and said feed means.

* * * * *